Feb. 21, 1950     O. J. POUPITCH     2,498,221
FASTENER UNIT
Filed Sept. 22, 1945
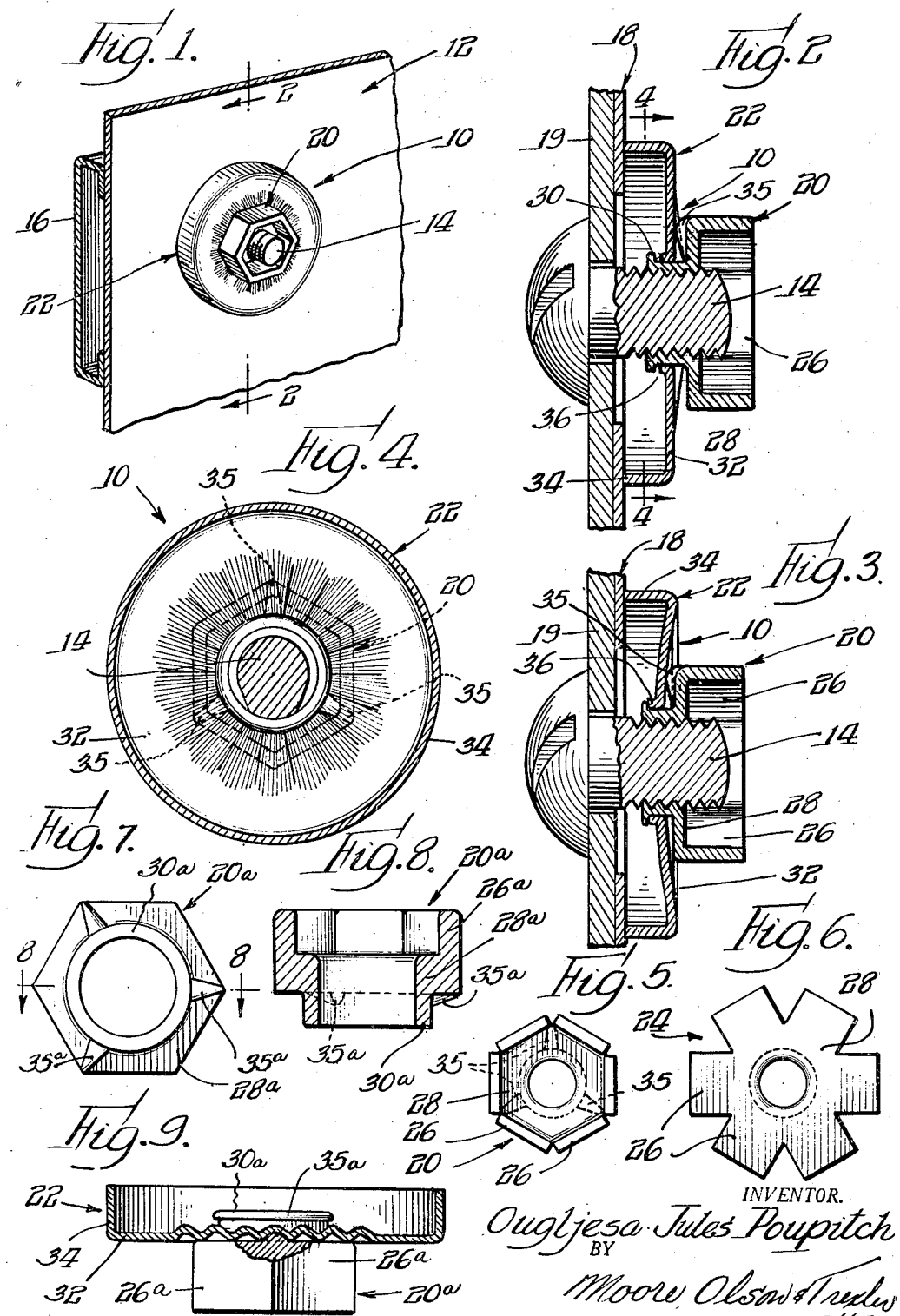
INVENTOR.
Ougljesa Jules Poupitch
BY
Moore Olson & Trexler
Attys.

Patented Feb. 21, 1950

2,498,221

UNITED STATES PATENT OFFICE 2,498,221

FASTENER UNIT

Ougljesa Jules Poupitch, Chicago, Ill., assignor to Illinois Tool Works, Chicago, Ill., a corporation of Illinois Application September 22, 1945, Serial No. 618,005

5 Claims. (Cl. 151—41.5)

This invention relates generally to fastener units of the screw threaded type and more particularly to fastener units embodying two relatively rotatable fastener elements connected as a unit, one a rotary threaded fastener part and the other a spring-locking element or washer associated therewith.

Experience has shown that when a rotary threaded fastener member, such as a nut, is to be tightened against certain types of work surfaces, the use of conventional nuts and lock washers is not desirable. Thus, for example, when it becomes necessary to tighten a nut against relatively thin stock such as the sheet metal stock of fenders for automobiles and the like, it is not practical to lock the nut in place by the use of conventional lock washers. The present invention contemplates the provision of a locking or fastening unit which is particularly adaptable to be used in association with relatively thin sheet metal surfaces and the like without causing any deflection of the work surface and at the same time, positively insuring the rotary threaded fastener member, such as a nut, against such unauthorized loosening. To this end the invention contemplates a very simple, yet highly efficient, device comprised of two relatively rotatable parts, one a rotary threaded fastener member, such as a nut, and the other a sheet metal washer element of dished form carried as a unit thereby having its outer margin, or edge, positioned radially outward from the nut a sufficient distance to facilitate axial deflection of the inner portion of the washer so as to materially increase resistance to retrograde rotation of the nut after the unit has been tightened against the work.

More specifically the invention contemplates a fastener unit, as set forth above, wherein the spring locking element, or washer, includes a radially extending washer-like body portion and an outer marginal flange portion extending laterally of the body to provide a work engaging edge designed to frictionally engage the work surface and in instances where desired, to sealingly engage the work surface.

The invention further contemplates an improved fastener unit having the structural characteristics referred to above, wherein means in the form of interlocking protuberances and recesses between the clamping side of a rotary threaded member and the adjacent surface of the washer member are provided for securing the parts against relative retrograde rotation after tightening.

It is a further object of the present invention to provide a fastener unit, as stated above, in which substantially no radial movement of the outer margin of the washer element occurs when the rotary fastener member is tightened to axially deflect the inner margin of the washer.

A further object of the present invention is to provide a fastener unit in which the rotary threaded fastener part constitutes a nut formed from sheet metal which is bent or drawn so as to provide a plurality of sides adapted to be engaged by a turning tool and a central neck portion of reduced size to receive the spring washer member and to afford sufficient nut stock for the internal thread.

A still further object of the present invention is to provide in the aforesaid fastener unit, a hollow nut member having a multi-sided socket for accommodating a turning tool and a reduced neck portion for rotatably accommodating the spring washer member.

The foregoing and other objects and advantages will be more apparent from the following detailed drawing wherein:

Fig. 1 is a perspective view showing the fastener unit of the present invention applied to relatively thin sheet metal stock;

Fig. 2 is an enlarged vertical sectional view taken substantially along the line 2—2 of Fig. 1 showing the fastener unit as applied to a sheet metal work piece having a relatively large aperture;

Fig. 3 is a view similar to Fig. 2 showing the fastener after it has been tightened against the work piece;

Fig. 4 is a vertical sectional view taken substantially along the line 4—4 of Fig. 2;

Fig. 5 is an elevational view of the sheet metal nut member as viewed from the right of Fig. 2;

Fig. 6 discloses a sheet metal blank from which the nut member of Fig. 5 may be formed;

Fig. 7 discloses the underside of a nut of modified form;

Fig. 8 is a central sectional view of the nut shown in Fig. 7 taken substantially along the line 8—8 of Fig. 7; and Fig. 9 is a side elevational view shown partly in section disclosing the nut of Figs. 7 and 8 secured as a unit with the spring-locking washer.

Referring now to the drawing more in detail wherein like numerals have been employed to designate similar parts throughout the various figures, it will be seen that one embodiment of my invention constitutes a fastener unit designated generally by the numeral 10. In Fig. 1 the fastener unit 10 is shown in operative association with a work piece or automobile fender 12. The fastener unit 10 cooperates with a screw 14 to secure a molding strip 16 against the work piece or fender 12. In Figs. 2 and 3 the fastener unit 10 is employed to secure a flat sheet or work piece 18 against the supporting plate 19.

In Figs. 1–4 inclusive, the fastener unit 10 includes a nut member 20 and a spring-nut-locking-washer member 22 carried as a unit by the nut member 20. The nut member 20 may be formed from a single sheet of metallic stock.

Fig. 6 discloses a sheet metal blank 24 having a plurality of marginal tabs 26 adapted to be folded or bent at right angles to an annular base portion 28 as illustrated in Fig. 5. These tabs 26 provide the side surfaces or walls of the nut which are adapted to be gripped by a conventional turning tool such as a wrench. A neck portion 30, of reduced diameter, extends axially from the annular body portion 28. The interior surface of the neck 30 is threaded to accommodate the screw member 14 and the outer surface thereof provides a washer retaining portion for accommodating the inner margin of the washer member 22.

The washer member 22 includes an annular disk-like body portion 32 which extends an appreciable distance beyond the periphery of the nut member 20. The outer margin of the body portion 32 is bent to form a flange 34 having an edge for frictionally engaging the work surface. Said flange is of sufficient axial extent to maintain the required spaced relationship between the body 32 and the work surface engaged by the flange 34. The inner margin, or edge, of the body portion 32 is bent at 36 so as to afford an axial dimension which is substantially greater than the thickness of the stock. An annular shoulder formed on the neck 30 of the nut 20 serves to prevent axial separation of the nut and washer.

The nut 20 and washer 22 are freely rotatable with respect to each other prior to the tightening, or clamping, of the washer against the work. In Fig. 2 the nut and washer are shown prior to tightening the nut against the washer. In Fig. 3 the nut is shown in its tightened position at which time the inner margin of the washer body has been axially deflected against the spring resistance of the washer body. The frictional engagement of the washer flange 34 with the work surface is such as to counteract the tendency of the washer to rotate as the nut is tightened thereagainst. To insure against inadvertent retrograde rotation of the nut with respect to the washer, the clamping area of the body portion 28 of the nut is provided with three equally spaced proturberances 35 and the adjacent area of the washer body is undulated. This provides a satisfactory interlock between the nut and the washer so as to counteract retrograde rotation of the nut after it has been tightened to the position shown in Fig. 3. In this position the outer edge of the washer not only bears firmly against the work surface, but the spring action of the washer operates to increase frictional resistance to retrograde rotation between the thread convolutions in the neck of the nut and the complementary convolutions of the screw member 14.

In Figs. 1–9 inclusive, a nut of modified construction is shown, this nut being designated generally by the numeral 20a. The nut 20a is formed with integrally connected wrench-receiving sections 26a, a body portion 28a and a neck portion 30a of reduced diameter. Protuberances 35a formed or extruded along the clamping side of the nut 20a cooperate with the aforesaid undulations in the washer member 22 as clearly illustrated in Fig. 9. After the washer and nut have been telescopically associated, the outer edge of the neck is upset to secure the parts against axial separation as previously described in connection with the fastener unit shown in Figs. 1–4 inclusive. It will be noted that the sheet metal nut 20 and the annularly continuous nut 20a provide an inner recess or socket for accommodating a socket-turning tool as distinguished from a wrench. By forming the nut of sheet metal stock the ease with which the nut socket may be formed is greatly facilitated. In constructing the nut from sheet stock the blank used may conform with the blank shown in Fig. 6 or other forms which will permit the nut to be formed or drawn in hexagonal shape.

It will be apparent from the foregoing that the invention contemplates a fastener unit arrangement which is particularly adaptable to be used against relatively thin stock. Sheet metal fender material, as shown in Fig. 1, is relatively thin and in securing such material in place care must be exercised so as to prevent the material of the work from being distorted or bent. By having a washer member of relatively large diameter carried as a unit by a nut member of relatively small diameter, considerable force may be applied to the relatively thin sheet stock without the potential hazard of deforming the stock. By having the annular washer body 32 normally maintained in spaced relationship from the work surface by the annular flange 34, the inner margin of said body may be axially flexed within relatively wide limits without subjecting the work-engaging washer edge to any appreciable radial movement. In other words, as the inner margin of the washer body is sprung to set up increased frictional resistance to rotation between the thread convolutions of the nut and screw, the pressure of the outer edge of the washer against the work is normal to the work surface and not parallel thereto. Thus disfigurement of the work surface, resulting from the engagement of the washer therewith, is positively prevented. The work-engaging edge of the washer, as shown in the drawing, provides a very effective seal against the entrance of moisture. In instances where increased frictional resistance to turning between the washer and the work is desired the washer edge may be roughened or provided with teeth.

The invention as set forth herein contemplates a fastener unit which includes two elements, namely a nut and a spring washer element in which said spring member extends radially beyond the periphery of the rotary threaded fastener or nut a sufficient distance to facilitate axial deflection of its inner margin when the outer margin is clamped against the work so as to materially increase frictional resistance to rotation of the threads of the rotary fastener. It is important that the washer member be properly dished so as to permit the required degree of axial deflection and at the same time, prevent radial movement or spreading of the washer member against the work surface. The neck portion of reduced diameter not only serves to accommodate the spring-washer member but also serves as an abutment to limit the extent of axial washer deflection as the nut is tightened against the washer body.

While for purposes of illustration certain specific embodiments of the invention have been disclosed and described herein, it will be apparent that the invention is capable of modifications and changes without departing from the spirit and scope of the appended claims.

I claim:

1. A fastener unit comprising a permanently united rotary fastener member having an internal thread helix and a thread locking spring washer carried thereby as a preassembled unit, said fastener member having a work facing surface at one end thereof, an implement engaging portion adjacent the other end thereof, and an annular sleeve portion therebetween, the washer comprising a dished sheet metal member having a central opening, the inner annular margin of which is rotatably mounted on said annular sleeve portion, and the washer body extending materially outwardly of the body of the fastener and having an outer marginal edge projecting away from the implement engagement portion of the fastener member for engagement with a workpiece, and a series of interlocking cooperative abutments on the fastener and washer for resisting relative rotation therebetween when in resilient engagement, the abutments on the fastener member extending radially outwardly of said sleeve portion said annular fastener sleeve portion being provided with limiting means towards which the inner annular margin of the washer is flexed as an incident to the coaction of said abutments, the abutments of the washer being disposed between said inner margin and outer marginal washer edge, whereby the resiliency of the washer body serves both to maintain said abutments interlocked and said outer marginal edge in engagement with the workpiece when the parts are in work clamping position, and said limiting means functions to limit the extent to which the inner margin of the washer may be axially shifted upon the flexing of the washer body by the engagement of the abutments.

2. A fastener unit in accordance with claim 1, wherein the spring washer comprises a relatively flat body portion having an axially extending outer margin, the free edge of which is adapted to engage a complementary work surface.

3. A fastener unit in accordance with claim 1, wherein the abutments on the spring washer comprise undulations along the inner marginal portion thereof.

4. A fastener unit in accordance with claim 1, wherein the rotary fastener member comprises a sheet metal nut structure which is centrally extruded to provide the annular sleeve.

5. A fastener unit in accordance with claim 1, wherein said limiting means consists of an annular laterally extending flange which provides a shelf for cooperation with the internal margin of the spring washer.

OUGLJESA JULES POUPITCH.

REFERENCES CITED

The following references are of record in the file of this patent:

UNITED STATES PATENTS

| Number | Name | Date |
| --- | --- | --- |
| Re. 19,492 | Winchester | Mar. 5, 1935 |
| 90,377 | Morehouse | May 25, 1869 |
| 271,571 | Burris | Jan. 30, 1883 |
| 1,320,259 | Martens | Oct. 28, 1919 |
| 1,394,740 | Klocke | Oct. 25, 1921 |
| 1,406,423 | Smith | Feb. 14, 1922 |
| 1,945,005 | Vacher | Jan. 30, 1934 |
| 2,081,065 | Place | May 18, 1937 |
| 2,347,852 | Thompson | May 2, 1944 |
| 2,376,167 | Mitchell | May 15, 1945 |

FOREIGN PATENTS

| Number | Country | Date |
| --- | --- | --- |
| 24,791 | France | June 26, 1922 |

Certificate of Correction

Patent No. 2,498,221                          February 21, 1950

OUGLJESA JULES POUPITCH

It is hereby certified that errors appear in the printed specification of the above numbered patent requiring correction as follows:

Column 3, line 55, for "rerograde" read *retrograde*; line 71, for "Figs. 1–9" read *Figs. 7–9*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*